(12) United States Patent
Rozman et al.

(10) Patent No.: US 9,998,047 B2
(45) Date of Patent: Jun. 12, 2018

(54) SYNCHRONOUS MACHINE WITH RECHARGEABLE POWER STORAGE DEVICES

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 116 days.

(21) Appl. No.: 14/598,858

(22) Filed: Jan. 16, 2015

(65) Prior Publication Data

US 2016/0211786 A1 Jul. 21, 2016

(51) Int. Cl.
| | |
|---|---|
| *H02P 9/00* | (2006.01) |
| *H02P 9/14* | (2006.01) |
| *H02K 19/12* | (2006.01) |
| *H02K 19/28* | (2006.01) |
| *H02K 19/36* | (2006.01) |
| *H02K 11/042* | (2016.01) |
| *H02K 11/33* | (2016.01) |

(52) U.S. Cl.
CPC .............. *H02P 9/14* (2013.01); *H02K 11/042* (2013.01); *H02K 11/33* (2016.01); *H02K 19/12* (2013.01); *H02K 19/28* (2013.01); *H02K 19/365* (2013.01)

(58) Field of Classification Search
CPC . H02P 9/14; H02K 9/14; H02K 9/365; H02K 9/28

USPC .......... 322/44, 59; 363/132, 98; 361/19, 58; 307/113; 318/400.31, 400.33
See application file for complete search history.

(56) References Cited

U.S. PATENT DOCUMENTS

| | | | |
|---|---|---|---|
| 6,476,529 B1 | 11/2002 | Tilbor | |
| 6,828,919 B1 * | 12/2004 | Gold | H02H 7/06 318/718 |
| 7,777,384 B2 | 8/2010 | Gieras et al. | |
| 8,148,867 B2 | 4/2012 | Gieras et al. | |
| 8,836,293 B1 | 9/2014 | Rozman et al. | |
| 2002/0043884 A1 | 4/2002 | Hunter | |
| 2004/0256922 A1 | 12/2004 | Steinmeyer | |

(Continued)

FOREIGN PATENT DOCUMENTS

| | | |
|---|---|---|
| DE | 3943278 A1 | 7/1991 |
| EP | 2779426 A2 | 9/2014 |
| JP | 2009017763 A | 1/2009 |

OTHER PUBLICATIONS

Extended Search Report issued May 19, 2016 in connection with co-ending application No. EP16151234.8.

(Continued)

*Primary Examiner* — Julio C. González R.
(74) *Attorney, Agent, or Firm* — Locke Lord LLP; Scott D. Wofsy; Christopher J. Cillié

(57) ABSTRACT

A rotor portion of a synchronous machine includes a rotor. The rotor carries a field winding and a re-chargeable power storage device. The re-chargeable power storage device is electrically connected to the field winding to provide electrical power to the field winding while in generate or motor mode, and to provide electrical power to the re-chargeable power storage device while in a charge mode.

16 Claims, 6 Drawing Sheets

(56) References Cited

U.S. PATENT DOCUMENTS

| 2007/0120539 A1* | 5/2007 | Bray | H02K 19/38 |
| | | | 322/59 |
| 2010/0226159 A1* | 9/2010 | Stern | H02M 7/5395 |
| | | | 363/132 |
| 2014/0266078 A1 | 9/2014 | Rozman et al. | |

OTHER PUBLICATIONS

European Patent Office Official Letter dated Aug. 3, 2017 received from European Patent Office for Application No. 16151234.8.
Office Action Received from the European Patent Office dated Feb. 27, 2017 for Application No. 16151234.8.
Official Letter received from European Patent Office (EPO) dated Jan. 3, 2018, re: examination of Application No. 16 151 234.8.

* cited by examiner

SYNCHRONOUS MACHINE WITH RECHARGEABLE POWER STORAGE DEVICES

BACKGROUND OF THE INVENTION

1. Field of the Invention

The present disclosure relates to synchronous machines, and more particularly to brushless wound field synchronous machines operating as a motor or generator.

2. Description of Related Art

Generators commonly include a rotor coupled to a prime mover and rotatably disposed relative to a stator. The stator generally carries armature windings while the rotor carries field coil for generating a magnetic field. As the prime mover rotates the rotor, the magnetic field produced by the rotor field coil interacts with the stator armature windings, thereby generating electric current. The electric current can be harvested from the armature windings for providing output voltage to power-consuming devices coupled to the generator. In generators with field coil, generator output voltage is typically regulated by the magnitude of the current supplied to the field coil. A separate off-rotor device typically conveys current for the field coil from the stator to the rotor during rotor rotation and in real-time with its provision to the rotor field coil, typically using a rotating rectifier carried by the rotor.

Such conventional methods and systems have generally been considered satisfactory for their intended purpose. However, there is still a need in the art for improved generators with improved field coil current control to achieve higher power density and faster dynamic response. The present disclosure provides a solution for this need.

SUMMARY OF THE INVENTION

A rotor portion of a synchronous machine generator includes a rotor. The rotor carries a field winding and a re-chargeable power storage device. The re-chargeable power storage device is electrically connected to the field winding to provide electrical power to the field winding in generate and/or motor mode, and to receive charging power to the re-chargeable power storage device in a charge mode.

In certain embodiments the re-chargeable energy storage device can include a battery, such as a lithium-ion battery or other suitable battery device. An inductor can be connected between the re-chargeable energy storage device and the rotating power converter, thereby reducing ripple in current provided to the re-chargeable energy storage device in the charge mode. A capacitor is connected in across the rotating power bus and is a part of the rotating power converter. It is also contemplated that the rechargeable energy storage device can include a capacitive device, such as a super capacitor or other suitable capacitive device.

In accordance with certain embodiments, the rotating power converter includes an asymmetric H-bridge connected between the rechargeable energy storage device and field winding. The one or more switches of the rotating power converter can include a solid-state switch device, such as a MOSFET, IGBT, or other suitable solid-state switch device. A first switch carried by the rotor can be connected in series between a positive terminal of the positive energy storage device and a source lead of the field winding. A second switch carried by the rotor can be connected in series between a negative terminal of the re-chargeable energy storage device and a negative lead of the field winding. The rotor can also carry a switch control module operatively connected to the first and second switches for changing current flow on the rotating dc bus as appropriate for the charge mode, generate mode, and/or motor mode.

It is contemplated that, in accordance with certain embodiments, rotating dc bus current flow can be in opposite directions based on the synchronous machine operating modes. For example, in the charge mode, current can flow from the rotating power converter to the re-chargeable energy storage device. In the generator and/or motor mode, current can flow from the re-chargeable energy storage device through the rotating power converter. A first diode is reverse biased connected to the negative rail of the rotating dc bus. A second diode is reverse biased connected to the positive rail of rotating dc bus.

A synchronous machine includes stator portion with an armature winding and a rotor portion, as described above, and rotatably disposed relative to the stator portion. The field winding carried by the rotor is inductively coupled to the armature winding of the stator portion. The field winding is electrically connected across the asymmetric H-bridge. A switch controller is operatively connected to the rotating power controller to regulate current magnitude and direction through the rotating power converter in a charge mode and generate or motor mode.

In embodiments, the switch control module can be connected to both the first and second switches of the rotating power converter. A communications transformer having a rotor winding carried by the rotor and a stator winding fixed relative to the rotor winding can be connected to the switch control module. The transformer rotor winding can be inductively coupled to the transformer stator winding such that a generator control unit can communicate with the switch control module through the communications transformer for controlling current flow in the field winding during generate or motoring modes, and in the re-chargeable energy storage during charging mode.

In certain embodiments, a rotating monitoring module can be carried by the rotor and can be connected to the energy storage device and field winding instrumentation. A suite of monitoring devices can be carried by the rotor and connected to the rotating monitoring module, such as a battery current sensor connected to the energy storage device, a battery temperature sensor thermally coupled to the energy storage device, a battery voltage sensor connected to the energy storage device, a field winding current sensor connected to the field winding, or other suitable sensor device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
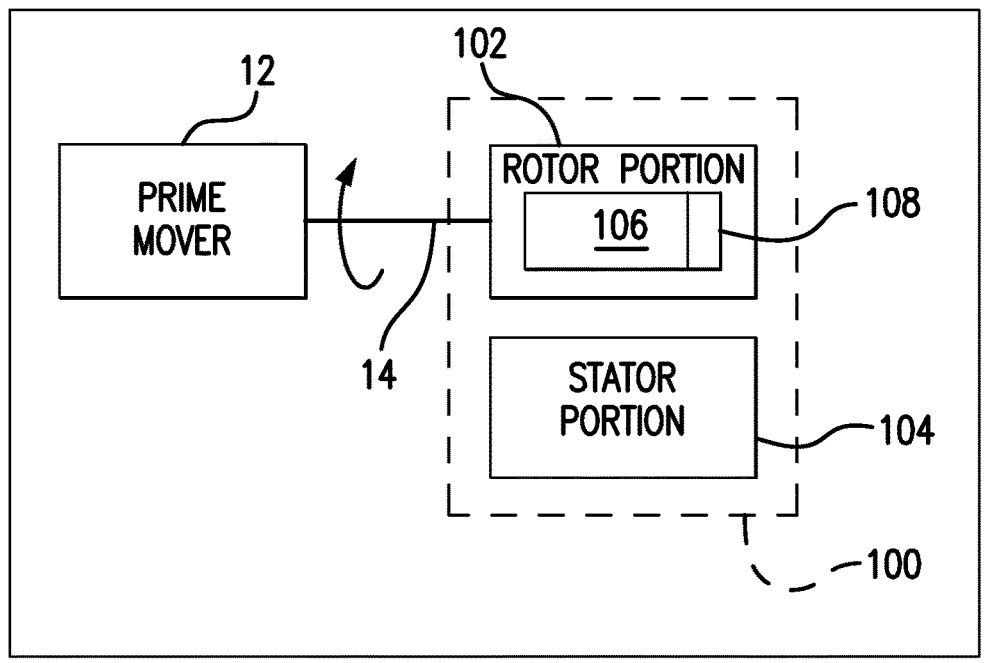
FIG. 1 is a schematic view of an exemplary embodiment of a synchronous machine constructed in accordance with the present disclosure, showing a power storage device.

Reference will now be made to the drawings wherein like reference numerals identify similar structural features or aspects of the subject disclosure. For purposes of explanation and illustration, and not limitation, a partial view of an exemplary embodiment of a synchronous machine generator with a rotor-born re-chargeable energy storage device in accordance with the disclosure is shown in FIG. 1 and is designated generally by reference character 100. Other embodiments of synchronous machines in accordance with the disclosure, or aspects thereof, are provided in FIGS. 2-6, as will be described. The systems and methods described herein can be used for generating electrical power in aircraft, such as in aircraft main engine and auxiliary power unit generators or starter/generators, as well as for generating electrical power in ground vehicles using internal combustion engine (ICE) as prime mover.

Rechargeable synchronous machine 100 is disposed within vehicle 10 and includes a rotor portion 102 and a stator portion 104. Rotor portion 102 is rotatably disposed relative to stator portion 104 and includes a rotor 106 (e.g., a shaft) carrying a re-chargeable energy storage device 108. A prime mover 12 such as a vehicle gas turbine engine or auxiliary power unit, or ICE connects to rotor portion 102 through a shaft 14 and is configured for supplying mechanical energy, i.e. rotation, to rotor portion 102 through shaft 14. Stator portion 104 carries a main armature winding 370 (shown in FIG. 4) that is inductively coupled to a field winding 112 (shown in FIG. 2) carried by rotor 106.

Figure 2:
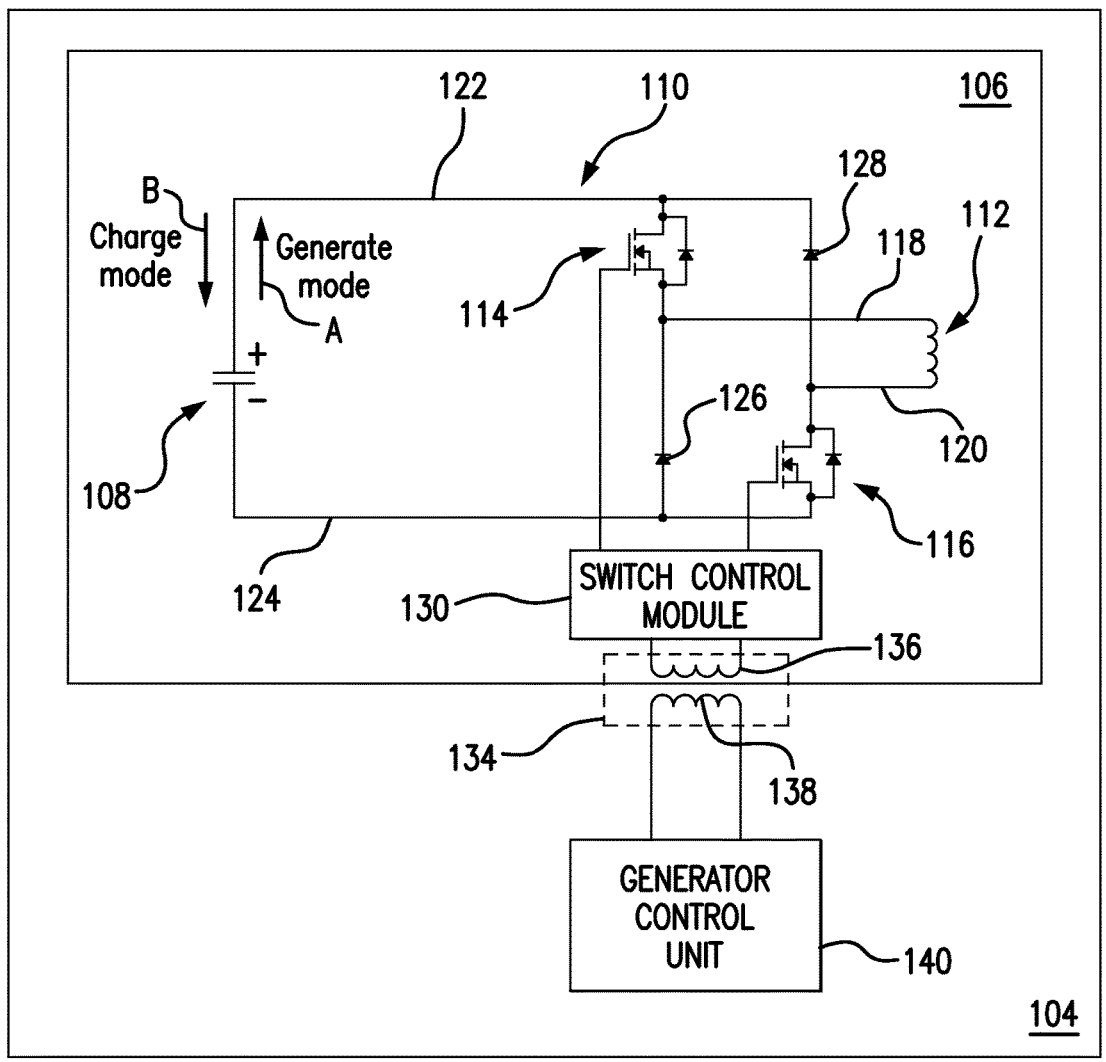
FIG. 2 is a circuit diagram of a rotor portion of the synchronous machine of FIG. 1, showing a rotating power converter including a capacitive storage device, according to an embodiment.

With reference to FIG. 2, synchronous machine 100 is shown schematically. Rotor 106 carries a rotating power converter 110. Rotating power converter 110 electrically interconnects re-chargeable energy storage device 108 with generator field winding 112 through a first switch 114 and a second switch 116. A source lead 118 of field winding 112 connects first switch 114 with field winding 112. A return lead 120 of field winding 112 connects second switch 116 with field winding 112. A positive rail 122 of rotating dc bus connects a positive terminal of re-chargeable energy storage device 108 with first switch 114. A negative rail 124 of rotating dc bus connects a negative terminal of re-chargeable energy storage device 108 with second switch 116.

Rotating power converter 110 also includes a first diode 126 and a second diode 128. First diode 126 is reverse biased and is connected between source lead 118 of field winding 112 and the negative rail 124. Second diode 128 is reverse biased and is connected between return lead 120 of field winding 112 and a positive rail 122.

Rotor 106 also carries a switch control module 130 and a rotor coil 136 of a communications transformer 134. As illustrated, switch control module 130 includes only a decoder module that decodes instructions received through rotor coil 136 communications transformer 134. In embodiments, switch control module 130 includes both an encoder module 242 and a decoder module 244 (shown in FIG. 3), and can both transmit status information relating to the health of rotating power converter 110, field winding 112, and re-chargeable energy storage device 108, as well as receive instructions through rotor coil 136 communications transformer 134.

Communications transformer 134 spans a gap between rotor portion 102 and stator portion 104, and includes a stator coil 138 fixed relative to transformer rotor coil 136. Stator coil 138 is connected to a generator control unit (GCU) 140, and is inductively coupled to rotor coil 136. Switch control module 130 is operatively connected to both first switch 114 and second switch 116 via respective drive leads carried by rotor 106. In this respect switch control module 130 is configured and adapted to regulate current flow through rotating power converter 110.

For example, in generate or motoring mode, first switch 114 and second switch 116 are turned-on. This applies rotating dc bus voltage to the field winding 112 resulting in building-up field current. When field current reaches desired (commanded) value, as measured by the field winding 112 current sensor 258 (shown in FIG. 3), second switch 116 is kept closed and first switch 114 is controlled by a fixed frequency current-mode PWM. The current in field winding 112 increases when first switch 114 is turned-on. When first switch 114 is turned-off, field current circulates through second switch 116 and diode 126 and decreases. For rapid de-energizing of field winding 112, both first switch 114 and second switch 116 are turned-off, resulting in reversal of voltage across the field winding 112 and rapid decrease of field current to zero. In this respect current flow through the armature field excitation windings, i.e. field winding 112, can be rapidly controlled, potentially improving improved voltage regulation as electrical load 380 (shown in FIG. 5) connected to synchronous machine 100. During this mode the field current flows through diodes 126 and 128 and field winding inductive energy is feedback to the re-chargeable energy storage device 108. To balance switching losses, the operation of first switch 114 and second switch 116 can be alternated. In a charge mode, switch control module 130 turns-off both first switch 114 and second switch 116. In this case the asymmetric H-bridge is reconfigured as a rotating single phase rectifier comprised of diodes 126 and 128, and antiparallel diodes associated with first switch 114 and second switch 116. AC voltage induced in the field winding 112 during charge mode is rectified by rotating power converter 110 re-configured as a single-phase rectifier. The dc current flow B on the rotating dc bus is applied to the re-chargeable energy storage device 108 to provide charge. The dc current flow B is controlled externally by the charger 350 (shown in FIG. 4) during charge mode by applying regulated high frequency ac power to the main armature winding 370 (shown in FIG. 4). Current flow B in turn charges re-chargeable energy storage device 108, allowing electrical energy provided to rotor portion 102 to be stored on-rotor for subsequent use in generate or motoring modes. In this respect power can be transmitted inductively, such as by flowing current through main armature winding 370 (shown in FIG. 4) such that current flow B is induced in field winding 112 and flowed to re-chargeable energy storage device 108. As will be appreciated, charging and discharging of re-chargeable energy storage device 108 can be a one-time event, such as in a life-limited vehicle, or cyclic, as suitable for a given application.

As illustrated, re-chargeable energy storage device 108 includes a capacitive device having positive and negative terminals. The capacitive device can be a super capacitor or any other suitable capacitive device. In embodiments, re-chargeable energy storage device 108 can be a battery device (shown in FIG. 2), such as a lithium-ion battery device or any other suitable battery device. Both embodiments provide a rotating power converter 110 and a re-chargeable energy storage device 108 for providing regulated direct current (DC) electrical power to field winding 112 through a reconfigurable rotating power converter 110.

As also illustrated, first switch 114 and second switch 116 include solid-state switch devices. First switch 114 and second switch 116 each include field effect transistor (MOSFET) devices each having a gate, a source, a drain, and a current blocking diode arranged across the source and drain arranged to oppose current flow from the drain to the source of the respective MOSFET device. It is to be appreciated that either or both of first switch 114 and second switch 116 can include other types of Si or SiC solid-state devices, such as integrated gate bipolar transistors (IGBT), or any other suitable solid-state switch device.

Figure 3:
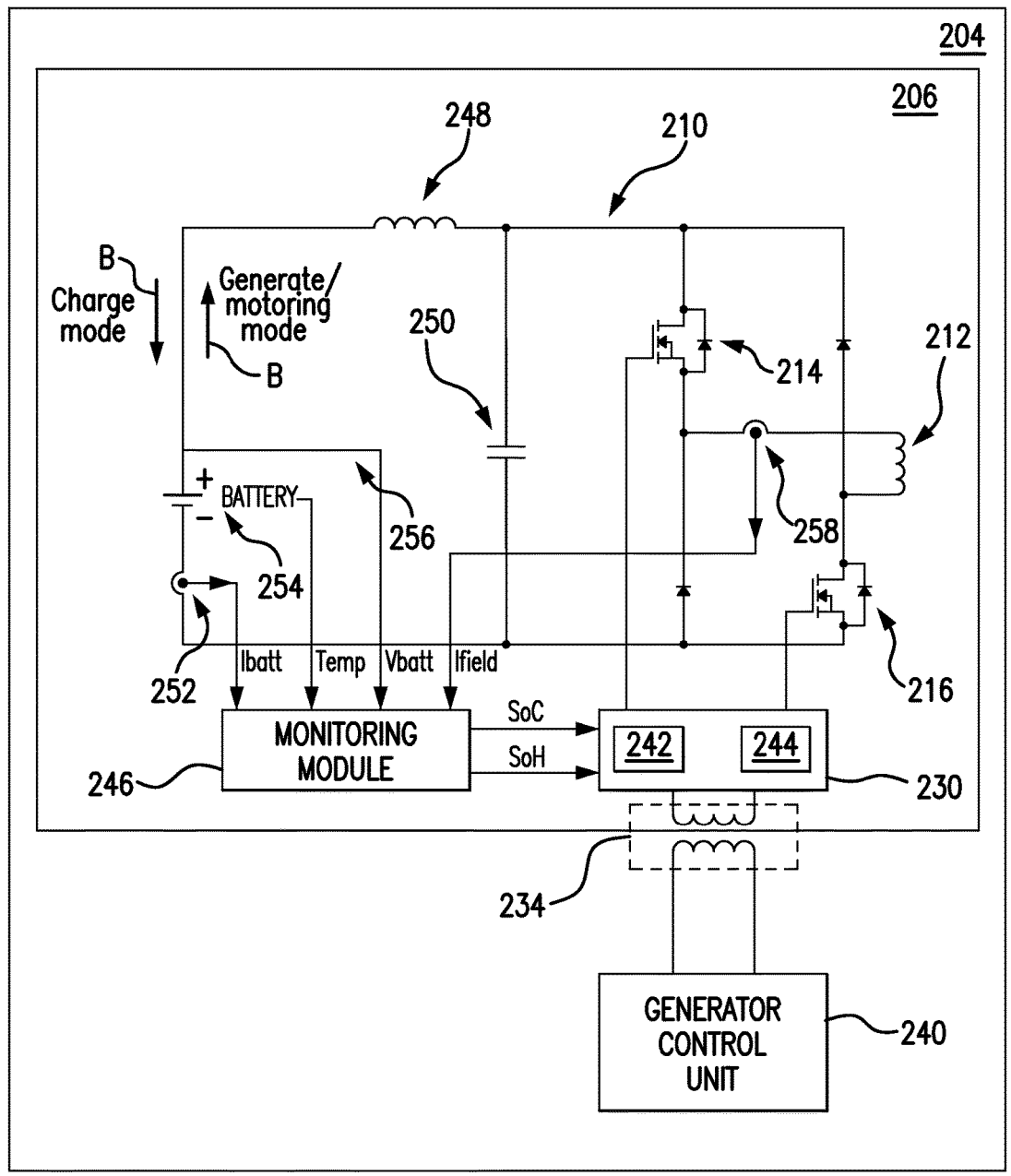
FIG. 3 is a circuit diagram of a rotor portion of the synchronous machine of FIG. 1, showing a rotating power converter including a battery storage device, according to an embodiment.

With reference to FIG. 3, a synchronous machine 200 is shown schematically. Synchronous machine 200 is similar to synchronous machine 100, and additionally includes a rotating power electronic system 210 that includes a rotating power converter 210 (asymmetric H-bridge) similar to rotating power converter 110 (shown in FIG. 2), a re-chargeable energy storage device including a battery device 208, and a rotating dc bus filter comprising an inductor 248, and a capacitor 250 carried on rotor 206. Synchronous machine 200 also includes a switch control unit 230 with an encoder module 242 and a decoder module 244 and a monitoring module 246, each carried by rotor 206. Battery device 208 can be a lithium-ion battery device or any other suitable type of battery device.

Capacitor 250 is connected across positive and negative rails of the rotating dc bus and is connected electrically in parallel with battery device 208. The capacitor 250 is a part of rotating dc bus and handles field winding 112 inductive energy fed back when both switches 214 and 216 are turned-off for rapid de-energizing of field winding 112. The capacitor 250 also reduces the rotating dc bus voltage ripple during generate/motoring PWM mode and single rectification charge mode. Inductor 248 is connected between the positive terminal of battery device 208 and capacitor 250. This reduces rippling in current flow B supplied to battery device 208 during the charge mode. Monitoring module 246 is communicative with generator control unit 240 through communication transformer 234. Monitoring module 246 is also coupled to rotating power converter 210 through a sensor array that includes one or more sensors, such as current sensors, voltage sensors and/or temperature sensors. As illustrated, the one or more sensor includes a battery current sensor 252, a battery temperature sensor 254, a battery voltage sensor 256, and a field winding current sensor 258. It is to be understood and appreciate the illustrated 'on rotor' sensor suite is only illustrative, and that other sensor arrangements are possible within the scope of the present disclosure as suitable for a given applications.

Monitoring module 246 receives signals from the one or more sensors including data relating to the health of rotating power electronic system 210. The received data includes information relating to battery current, battery voltage, battery temperature, and main field current. Monitoring module 246 processes the signal(s) and communicates the information to switch control module 230 in the form of a state-of-charge signal SoC and/or a state-of-health signal SoH.

Figure 4:
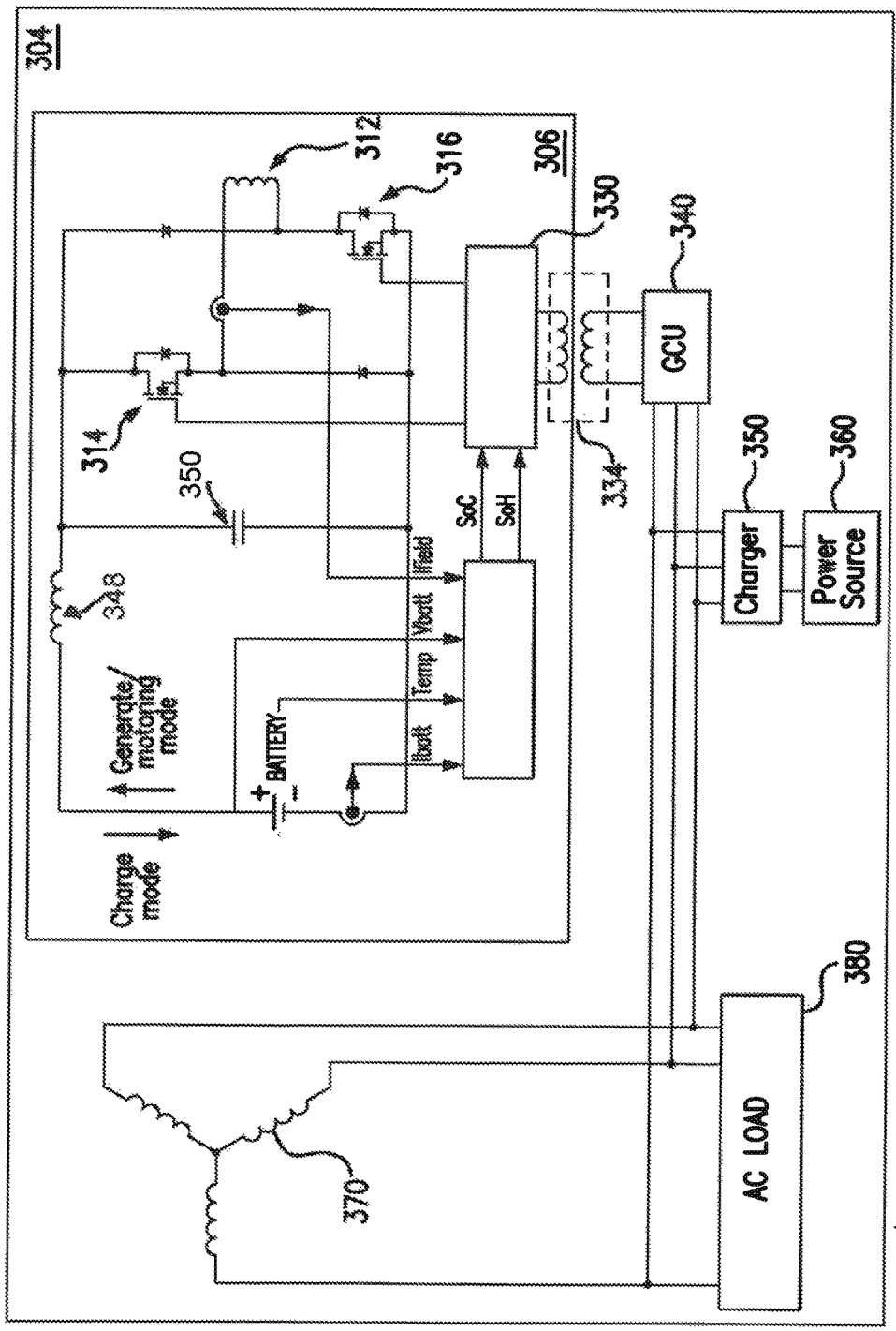
FIG. 4 is a functional diagram of electric power generating system that incorporates a synchronous machine with rechargeable power storage devices, according to an embodiment.
Figure 5:
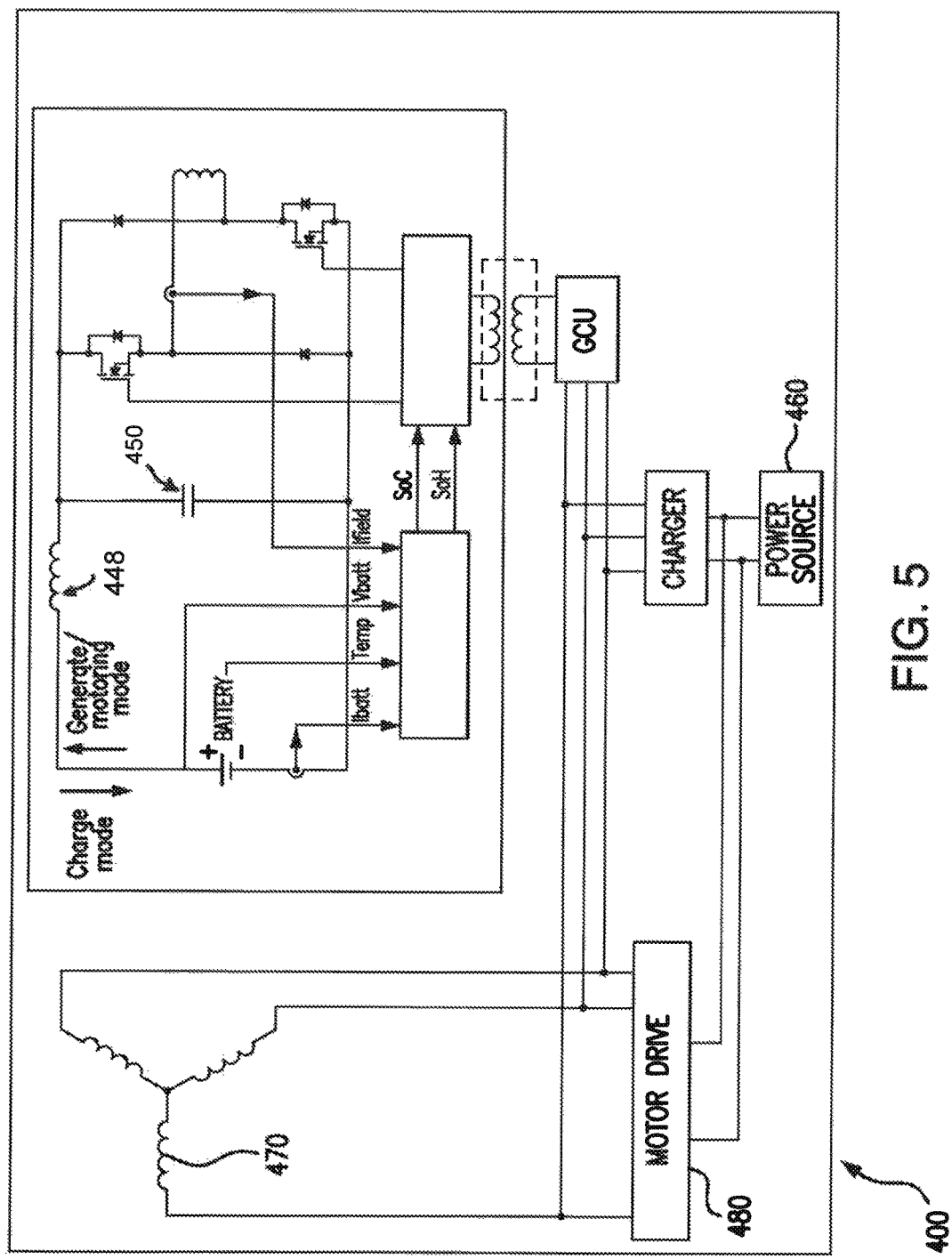
FIG. 5 is a functional diagram of motor drive system that incorporates a synchronous machine with rechargeable power storage devices, according to another embodiment.

Battery/field monitoring module 246 provides either or both of the state-of-charge SoC and the state-of-health SoH signals that are used by GCU 240 for optimal battery charging and prognostics. In embodiments, switch control module 230 communicates with GCU 240 through communication transformer 234. With reference to FIG. 4, an electric power generating system (EPGS) utilizing a synchronous machine 300 with rechargeable energy storage device is shown. EPGS 300 additionally includes a charger 350, a power source 360, and an electrical load 380, which can be an alternating current (AC) electrical load 380 connected to main armature winding 370. The main armature winding 370 is also connected to the GCU 340 and charger 350 powered by a power source 360. When GCU 340 determines that battery 308 requires charging, GCU 340 electrically connects power source 360 through charger 350 to main armature winding 370 and electrically disconnects electrical load 380. This arrangement induces current in field winding 312 controlled by GCU 340 to obtain optimal battery 308 charging current. With reference to FIG. 5, a motor drive system 400 utilizing synchronous machine with a re-chargeable energy storage device is shown. Motor drive system 400 additionally includes a motor drive 480 connected to both armature winding 470, and a charger 350 (shown in FIG. 3) powered by a power source 460. When GCU 340 (shown in FIG. 3) determines that battery 308 (shown in FIG. 3) requires charging, GCU 340 electrically connects power source 460 through charger 350 to main armature winding 370 and electrically disconnects motor drive 480.

Figure 6:
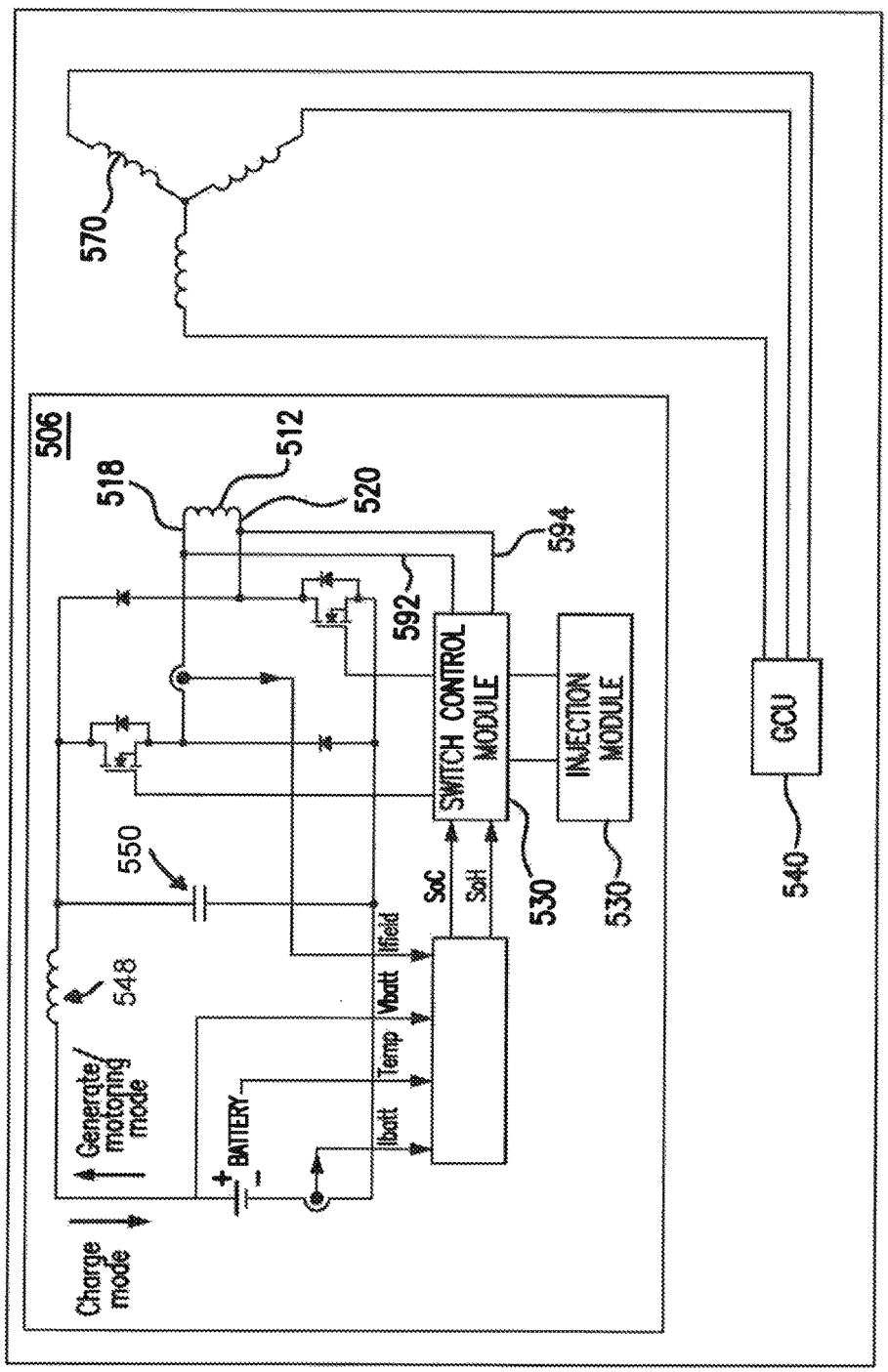
FIG. 6 is a circuit diagram of a rotor portion of the synchronous machine of FIG. 1, showing an alternative method for controlling the rotating power converter through the stator armature windings using high frequency carrier and without a commutation transformer.

With reference to FIG. 6, a synchronous machine rotor 500 is shown. Synchronous machine 500 is similar to synchronous machine 200 (shown in FIG. 3), and additionally includes an injection module 590. This configuration enables power line communication and eliminates a communication transformer 134 (shown in FIG. 2). Injection module 590 includes encoder 242 and decoder 244 functions (shown in FIG. 3) and is connected to switch control module 530. Switch control module 530 is connected to source lead 518 of field winding 512 and return lead 520 of field winding 512. A carrier signal is injected in to armature winding 570 either by GCU 540 to communicate instructions for switch control module 530 or to provide feedback through field winding 512 and armature winding 570 to GCU 540 using a signal generated by injection module 590. This allows for communication between GCU 540, switch control module 530, and monitoring module 546 without a rotating transformer, e.g. communications transformer 234 (shown in FIG. 5).

In embodiments, synchronous machines described herein provide improved power density of wound field synchronous machines similar to conventional permanent magnet machines. This allows for generating electrical power in applications without the use of rare-earth permanent magnets, avoiding the potential challenges of material availability and cost that can be associated with rare-earth permanent magnets. In certain embodiments, synchronous machines described herein can provide improved generator responsiveness with the ability to rapidly de-energize the main field winding, improving dynamic response in voltage regulation and protection.

The methods and systems of the present disclosure, as described above and shown in the drawings, provide for synchronous machine with improved power density, efficiency, diagnostic capability, and/or intelligence. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A synchronous machine rotor portion, comprising:
a rotor carrying a field winding; and
a re-chargeable energy storage device carried on the rotor; and
a rotating power converter with a first switch and a second switch carried on the rotor and electrically connected to the re-chargeable energy storage device to receive direct current electrical power and electrically connected to the field winding to provide direct current electrical power to the field winding,
wherein the first switch is connected in series between a positive terminal of the energy storage device and the field winding,
wherein the second switch is connected in series between a negative terminal of the energy storage device and a return lead of the field winding to provide two-way current flow through a positive rail of the rotating power converter between the energy storage device and the field winding for rapidly de-energizing the field winding; and
a diode connected between a source lead of the field winding and the negative terminal of the energy storage device, and in series with the first switch, the diode arranged to oppose current flow from the first switch to the negative terminal of the energy storage device.

2. The rotor portion as recited in claim 1, wherein the energy storage device includes a capacitive device.

3. The rotor portion as recited in claim 1, wherein the energy storage device includes a battery device.

4. The rotor portion as recited in claim 1, further including an inductor electrically connected between the energy storage device and the rotating power converter.

5. The rotor portion as recited in claim 1, further including a capacitor connected in parallel with the positive and negative terminals of the energy storage device.

6. The rotor portion as recited in claim 1, further including a switch control module carried on the rotor and operatively connected to the first switch and the second switch.

7. The rotor portion as recited in claim 1, wherein the diode is a first diode, and further including a second diode connected between the positive terminal of the energy storage device and a return lead of the field winding.

8. A synchronous machine, comprising:
a stator portion with an armature winding;
a rotor portion as recited in claim 1 rotatably disposed relative to the stator portion,
a switch control module operatively connected to the rotating power converter first switch and second switch to reverse current flow through the rotating power converter, wherein the switch control module has a generate mode or motor mode and a charge mode; and
a communications transformer spanning a gap between the stator portion and the rotor portion connecting a generator control unit to the switch control module.

9. The synchronous machine as recited in claim 8, wherein the communications transformer includes a rotor coil and a stator coil, wherein the synchronous machine rotor portion carries the rotor coil, wherein the stator coil is inductively coupled to the rotor coil and is fixed relative to the rotor coil.

10. The synchronous machine as recited in claim 8, further including a monitoring module carried by the rotor and communicative with the switch control module.

11. The synchronous machine as recited in claim 8, further including at least one monitoring device carried by the rotor and selected from a group including (a) a battery current sensor connected to the energy storage device, (b) a battery temperature sensor thermally coupled to the energy storage device, (c) a battery voltage sensor connected to the energy storage device, and (d) a field winding current sensor connected to the field winding.

12. A synchronous machine rotor portion, comprising:
a rotor carrying a field winding; and
a re-chargeable energy storage device carried on the rotor; and
a rotating power converter with a first switch and a second switch carried on the rotor and electrically connected to the re-chargeable energy storage device to receive direct current electrical power and electrically connected to the field winding to provide direct current electrical power to the field winding,
wherein the first switch is connected in series between a positive terminal of the energy storage device and the field winding,
wherein the second switch is connected in series between a negative terminal of the energy storage device and a return lead of the field winding to provide two-way current flow through a positive rail of the rotating power converter between the energy storage device and the field winding for rapidly de-energizing the field winding; and
a diode connected between a return lead of the field winding and the positive terminal of the energy storage device, and in series with the second switch, the diode arranged to oppose current flow from the positive terminal of the energy storage device to the second switch.

13. The rotor portion as recited in claim 12, wherein the diode is a first diode and further comprising a second diode, the second diode connected between a source lead of the field winding and the negative terminal of the energy storage device.

14. The rotor portion as recited in claim 12, wherein the energy storage device includes a capacitive device.

15. The rotor portion as recited in claim 12, wherein the energy storage device includes a battery device.

16. A synchronous machine, comprising:
a stator portion with an armature winding;
a rotor portion as recited in claim 12 rotatably disposed relative to the stator portion,
a switch control module operatively connected to the rotating power converter first switch and second switch to reverse current flow through the rotating power converter, wherein the switch control module has a generate mode or motor mode and a charge mode; and a communications transformer spanning a gap between the stator portion and the rotor portion connecting a generator control unit to the switch control module.

\* \* \* \* \*